No. 620,448. Patented Feb. 28, 1899.
J. H. HARNLY.
NUT LOCK.
(Application filed July 21, 1898.)
(No Model.)

Witnesses:
W. M. Hall.
C. G. Bassler.

Inventor.
Joseph H. Harnly.
By Attorney
Wm. R. Gerhart

UNITED STATES PATENT OFFICE.

JOSEPH H. HARNLY, OF MANHEIM, PENNSYLVANIA, ASSIGNOR TO LAVINA D. HARNLY, OF SAME PLACE.

NUT-LOCK.

SPECIFICATION forming part of Letters Patent No. 620,448, dated February 28, 1899.

Application filed July 21, 1898. Serial No. 686,506. (No model.)

*To all whom it may concern:*

Be it known that I, JOSEPH H. HARNLY, a citizen of the United States, residing at Manheim, in the county of Lancaster, State of Pennsylvania, have invented certain Improvements in Nut-Locks, of which the following is a specification.

This invention relates to improvements in that class of devices designed for locking nuts on bolts; and the object of the invention is to lock the nut in any position it may occupy when screwed home and without it being necessary for any special parts of the nut and the bolt to range or coincide with each other.

The invention consists in the construction and combination of the various parts, as hereinafter fully described and then pointed out in the claims.

Figure 1:
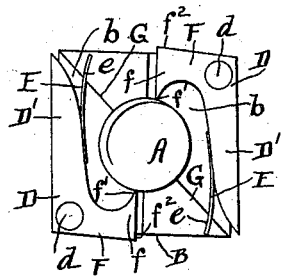
Figure 2:
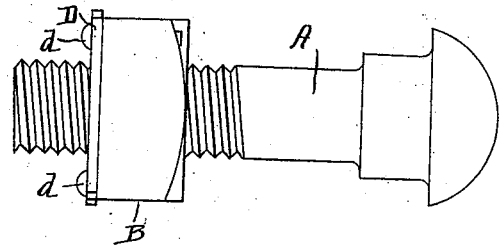
Figure 3:
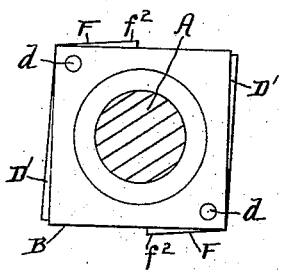
Figure 4:
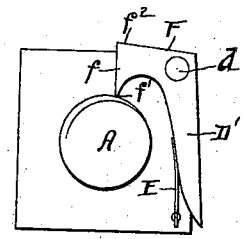

In the accompanying drawings, which form a part of this specification, Figure 1 is a front face view of a nut embodying my invention, being shown in place on a bolt; Fig. 2, a top view, and Fig. 3 a rear face view, of the nut, the bolt being shown in section. Fig. 4 is a front face view of a modified construction of the nut, and Fig. 5 a similar view of a second modification.

Similar letters indicate like parts throughout the several views.

Referring to the details of the drawings, A indicates a bolt, and B a nut having two recesses $b$ cut in its outer face and in diagonally opposite corners thereof, and these recesses extend from the outer edges of the nut to the bolt-hole in the center, as shown in Fig. 1. In each of these recesses and at the corners of the nut a lever D is fulcrumed on a pin $d$. The arms of the levers form somewhat of an obtuse angle with each other, with the angles of the outer edges coinciding with the corners of the nut against which they rest. One arm D' of each lever extends almost the full length of the side of the nut and has the outer edge of its free end projecting beyond the adjacent side of the nut, as shown in Figs. 1 and 3. The inner edge of the free end of said lever-arm is engaged by an end of a spring E, the other end $e$ whereof is secured in the adjacent wall G of the recess. Similarly the outer edge of the free end of the other and shorter arm F of the lever projects beyond the adjoining side of the nut. On the extremity of the inner edge of the lever-arm F is formed a dog $f$, having a hardened point or edge $f'$, adapted to bite into any portion of the thread of the nut against which it may be forced. The edges of these dogs are located in line between the projecting edges of arms F and the thread of the bolt, as shown in the drawings.

In operating, the nut is screwed onto the bolt in the usual manner, the dogs being held against the thread of the bolt by the pressure of springs E. After the nut has been screwed home the points or edges $f'$ of the dogs are forced to bite into the thread of the bolt by blows or pressure on the heels $f^2$ of said dogs, which project beyond the sides of the nut, as described, for that purpose. To release the dogs from engagement with the thread of the bolt, pressure is exerted upon the free ends of lever-arms D', which also project beyond the sides of the nut, as described, for that purpose. The advantage of this construction is that heels $f^2$ are in line with points or edges $f'$, so that the force of any blows on said heels acts directly on the points of the dogs to force them into the thread of the bolt.

Figure 5:
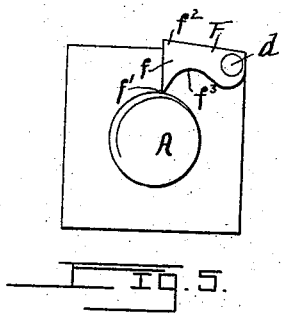

If preferable, the recesses $b$ in the face of the nut may be dispensed with and the levers secured to the flat face of the nut, and but one lever need be employed instead of two, all of which is shown in the modified construction illustrated in Fig. 4. The springs E may also be dispensed with and the lever or levers may be attached to the inner face of the nut. Even lever-arms D' may be omitted, as shown in Fig. 5, and the dogs be disengaged from the thread of the bolt by inserting a pin or other device under the dogs and prying them open, as said dogs have concave inner edges, as shown at $f^3$; but I prefer the construction shown in Figs. 1, 2, and 3.

I am aware that it is not new to employ a dog adapted to bite into the thread of a bolt to lock the nut thereon, a construction of that character being shown and described in the patent to Benjamin G. Miller, No. 287,041, dated October 23, 1883. I therefore do not claim such a combination broadly; but What I do claim as my invention, and desire to secure by Letters Patent, is—

1. The combination, with a bolt and a nut, of an arm having one end pivoted to the nut, and a dog on the free end of the arm and having its edge located between the heel thereof and the thread of the nut, said heel, the edge of the dog and the part of the thread of the bolt engaged by said edge lying in a line outside of said pivot of the arm, the edge of the dog being adapted to be forced into the thread of the bolt by blows or pressure on said heel, for the purpose specified.

2. The combination, with a bolt and a nut, of a lever pivoted between its ends to the nut, and a dog on one of the lever-arms and having its edge located between the heel of the dog and the thread of the nut, said heel, the edge of the dog and the part of the thread of the bolt engaged by said edge lying in a line outside of said pivot of the lever, the edge of the dog being adapted to be forced into the thread of the bolt by blows or pressure on said heel, for the purpose specified.

3. The combination, with a bolt and a nut, of a lever pivoted to the face of the nut, the free ends of the lever-arms projecting beyond the sides of said nut, and a dog on one of the lever-arms and located in line between the projecting end of said lever-arm and the thread of the bolt, the edge of the dog being adapted to be forced into said thread by blows or pressure on the projecting end of the lever-arm on which said dog is formed, for the purpose specified.

4. The combination, with a bolt and a nut, of a lever pivoted to the face of the nut, the free ends of the lever-arms projecting beyond the sides of said nut, a dog on one of the lever-arms and located in line between the projecting end of said lever-arm and the thread of the bolt, the edge of the dog being adapted to be forced into said thread by blows or pressure on the projecting end of the lever-arm on which said dog is formed, and a spring bearing against the inner edge of the other lever-arm, for the purpose specified.

5. The combination, with a bolt, of a nut having a recess in the face thereof and extending from the sides of said nut to the bolt-hole, a lever pivoted in said recess, the free ends of the lever-arms projecting beyond the sides of the nut, a dog on one of the lever-arms and located in line between the projecting end of said lever-arm and the thread of the bolt, the edge of the dog being adapted to be forced into said thread by blows or pressure on the projecting end of the lever-arm on which said dog is formed, and a spring bearing against the inner edge of the other lever-arm, for the purpose specified.

6. The combination, with a bolt, of a nut having recesses in diagonally opposite corners of one face, a lever pivoted in each of said recesses and at the angle of the nut, the angles of the levers coinciding with the angles of the nut, the outer edges of the lever-arms projecting beyond the sides of the nut, a dog on corresponding ends of each of the levers and located in line between the projecting ends of said lever-arms and the thread of the bolt, the edges of the dogs being adapted to be forced into said thread, and a spring beneath the other arm of each lever and having one end bearing against said arm and the other end secured in a wall of the recess, substantially as and for the purpose specified.

JOSEPH H. HARNLY.

Witnesses:
JOHN W. APPEL,
WM. R. GERHART.